June 23, 1964     C. A. TEDRICK     3,138,260
BICYCLE HITCH
Filed June 14, 1961     2 Sheets-Sheet 1
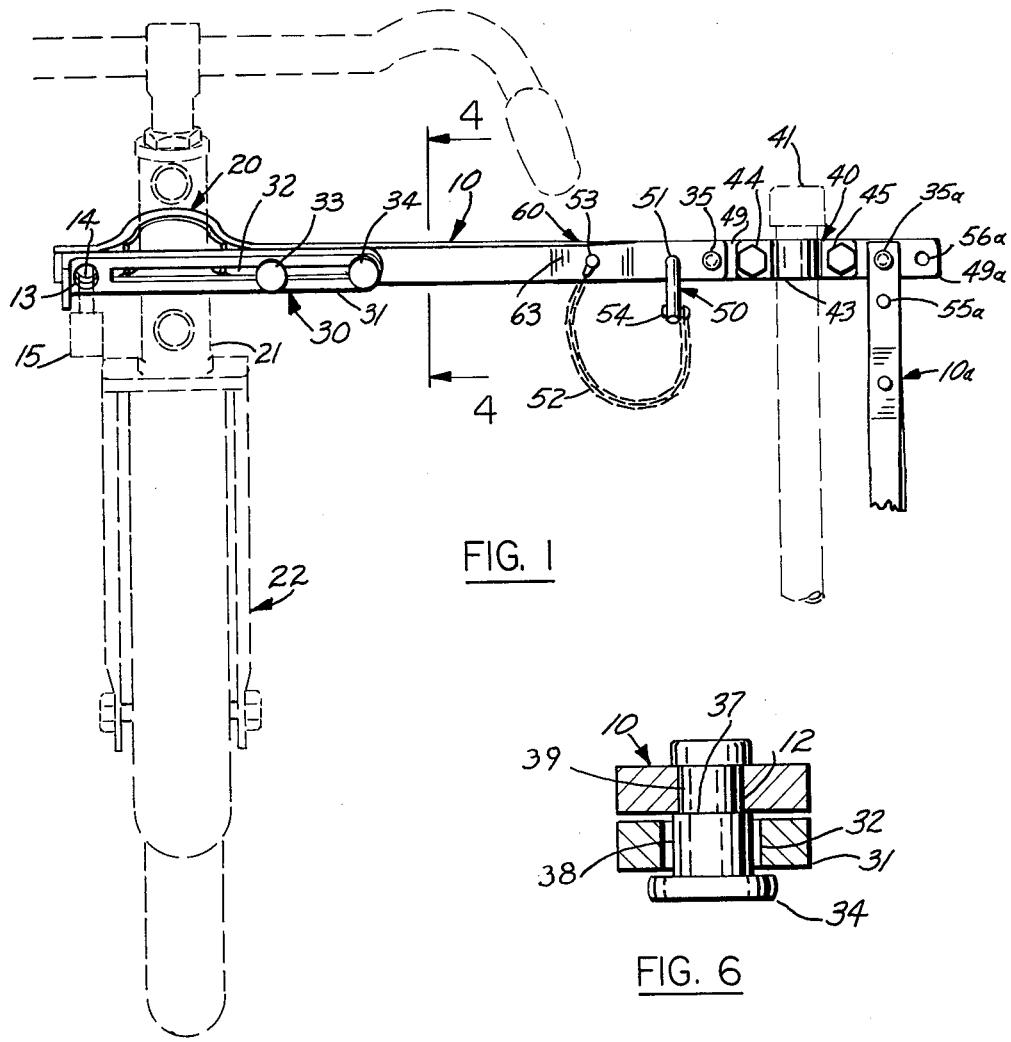
FIG. 1
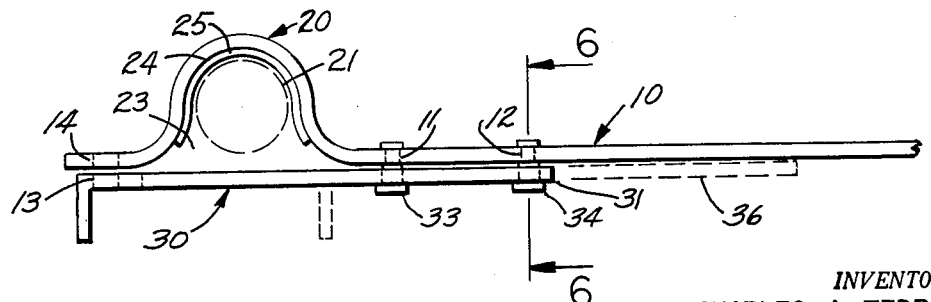
FIG. 6
FIG. 2
INVENTOR.
CHARLES A. TEDRICK
BY *James E. Fralick*
ATTORNEY June 23, 1964      C. A. TEDRICK      3,138,260
BICYCLE HITCH Filed June 14, 1961      2 Sheets-Sheet 2

INVENTOR.
CHARLES A. TEDRICK
BY James E. Frolich
ATTORNEY

United States Patent Office 3,138,260
Patented June 23, 1964

3,138,260
BICYCLE HITCH
Charles A. Tedrick, 2271 Ashley Drive,
Columbus 24, Ohio
Filed June 14, 1961, Ser. No. 117,068
9 Claims. (Cl. 211—18)

The invention disclosed herein and illustrated in the appended drawings relates generally to devices for maintaining a parked bicycle in an upright position.

More specifically, this invention relates to a device which can be installed in an area designated to serve, at times, as a bicycle parking area. Such installation may be accomplished by securing the subject device in fixed relation with a relatively stable feature, located in the designated area, which is capable of supporting a bicyle in an upright position. For example, the device of this invention is adapted for being so attached either to a vertical post, or to a vertically disposed plane surface such as a wall, in the manner described hereafter.

This invention is further constructed so as to be collapsible at times when the need for its use is not anticipated. Thus that portion of the designated parking area which is obstructed by the device may be minimized, when no need for its use is anticipated, so as to free much of the parking area for through traffic or other desired use.

Objects

One of the objects of the present invention is to provide a device for securing a parked bicycle in a vertical position.

Another object of this invention is to provide a bicycle hitch which can be pre-positioned for immediate use and retained in such position.

A further object of the invention is to provide a bicycle hitch which utilizes a minimum of space at times when its immediate use is not anticipated.

Still further objects and features of this invention will be apparent from the subjoined specification and claims, when they are considered in connection with the attached drawings.

Drawings

In the drawings which illustrate two specific embodiments of the invention:

FIG. 1 is a side view of a device, constructed according to the preferred embodiment of this invention, shown in operating association with a stationary post and a parked bicycle, each of the latter being designated by broken lines, with parts of the bicycle and post omitted for clarity.

FIG. 2 is an edge view of that portion of the device of FIG. 1 which is adapted for engaging a structural element of a bicycle, other portions of the device being omitted from this view.

FIG. 6 is a view in section taken along the line 6—6 of FIG. 2.

Description

Figure 3:
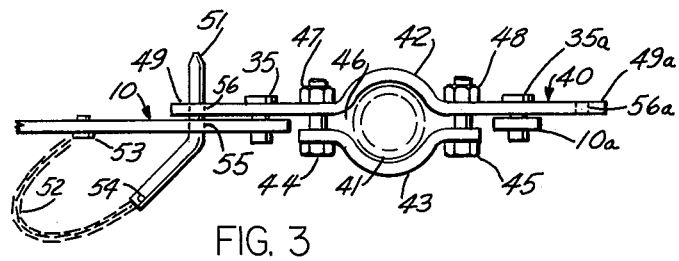
FIG. 3 is an edge view of that portion of the device of FIG. 1 which is adapted for engaging a vertical post, other portions of the device being omitted in this view.

Briefly stated, the device of my invention comprises an arm 10, formed with means 20 for containing a structural element 21 of a bicycle. Bolt means 30 is slidably secured to arm 10, for at times retaining the bicycle element within means 20. Arm 10 is pivotally connected to separate means 40 for securing arm 10 to a stable, vertically disposed structure such as a support post 41. Means 50 is secured to arm 10 for retaining said arm in specific angular relation with means 40, at times when it is desired to make the device available to support a parked bicycle.

Referring to the drawings for more detailed description of two embodiments to this invention, it will be seen that FIG. 1 shows one embodiment to be a device for securing a vertically disposed structural element, such as the fork post 21, of a bicycle 22 to a stationary post 41, which has, preferably, a generally cylindrical configuration. The invention comprises a bar 10 formed with the overall configuration shown in FIGS. 1, 2 and 3.

Referring specifically to FIG. 2, it will be seen that means 20 is formed in arm 10, near one of its opposite ends, for containing a bicycle frame element 21. Means 20 comprises a bow, formed in bar 10, having sufficient inside dimensions for accommodating a vertically disposed structural element of a bicycle. A pad 25 of resilient material is secured by suitable means to the inner surface 24 of bow means 20, to prevent marring the finish on an element 21 of a parked bicycle.

Means 30 is provided for retaining a bicycle element 21 within bow 20, at times when it is desired to secure a bicycle to the device in such manner that the bicycle 22 will not be accidentally disengaged from the bicycle hitch of the present invention. Means 30 comprises a bolt 31, formed with a slot 32 (FIG. 1) disposed longitudinally thereof. Bolt 31 is slidably secured to arm 10 by a plurality of rivets 33 and 34 (FIG. 6).

A shoulder 37 is formed on the body of each of said rivets 33 and 34, intermediate a body portion of major diameter 38 and a body portion of minor diameter 39. Body portion 38 has a diameter less than the width dimension of slot 32 of bolt 31 (FIG. 1). Minor diameter portion 39 has dimensions suitable for permitting rivets 33 and 34 to be firmly secured within bores 11 and 12 respectively, which are located in arm 10 (FIG. 2). When portions 38 of rivets 33 and 34 are contained within slot 32 of bolt 31, and said rivets are secured within bores 11 and 12 of arm 10 in the manner shown in FIG. 6; it is apparent that bolt 30 is retained in face to face engagement with arm 10 as seen in FIG. 2, and is slidable across rivets 33 and 34 from the closed position shown in solid lines to the open position 36 which is indicated by broken lines. Thus bolt 31 is slidably secured to arm 10 so as to be slidably repositionable, along and adjacent arm 10, within the limits of cooperation of rivets 33 and 34 and slot 32 of bolt 31.

Arm 10 is pivotally attached, by a suitable rivet 35 (FIG. 3) to means 40 for securing arm 20 in rigid frictional engagement with a suitable support post 41. Means 40 comprises a plurality of oppositely disposed clamp jaws 42 and 43, which are interconnected by bolts 44 and 45, arranged on opposite sides of an opening 46, defined by the cooperating jaws. Jaws 42 and 43 are so proportioned as to receive post 41 within opening 46; and to be clampable, in rigid frictional engagement, with post 41 when bolts 44 and 45 are drawn into nuts 47 and 48. Jaw 42 is provided with oppositely disposed ears 49 and 49a, and arm 10 is attached to one of such ears in the manner previously described.

Means 50 is provided for at times retaining arm 10 against rotational motion about rivet 35, and thus maintaining arm 10 in any predetermined angular relationship with clamp means 40 and post 41. Means 50 comprises a pin 51 which may, if desired, be secured to arm 10 by means of a suitable chain 52. One end of chain 52 is attached to arm 10 by rivet 53 and the opposite end is attached to pin 51 by rivet 54, so as to retain the pin in the vicinity of openings 55 and 56, formed in arm 10 and ear 49 respectively (FIG. 3), and thus avoid misplacing the pin.

When it is desired to retain arm 10 in a horizontal position, thus making the device ready for immediate use as a bicycle hitch, pin 51 is inserted and allowed to remain within openings 55 and 56, for retaining the bores in mutual register and retaining arm 10 in the extended, or horizontal, position shown in FIG. 3.

Figure 4:
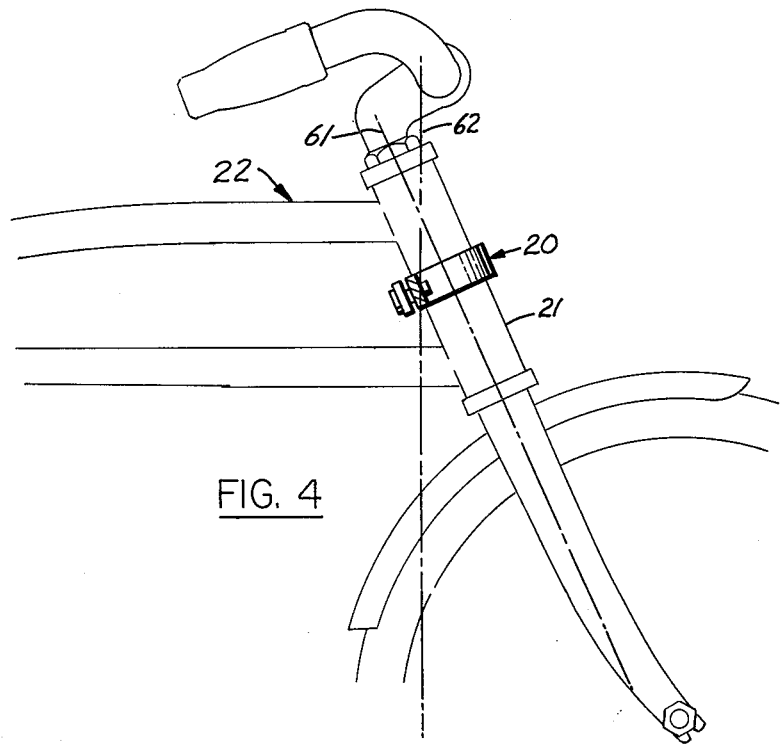
FIG. 4 is a view in section taken along the line 4—4 of FIG. 1.

It is recognized that the fork bearing post 21 of a standard bicycle 22 varies from the perpendicular, when viewed in the side elevation seen in FIG. 4. A comparison of bicycles presently in use reveals that the longitudinal axes 61 of the bicycle elements 21, found on such bicycles, are disposed approximately 24 degrees from the longitudinal axis 62 of a vertically disposed, stationary post 41, such as that seen in FIG. 1. Thus means 60 is provided in this invention for aligning means 20 with bicycle element 21 when means 40 is similarly aligned with the axis of a vertical post 41 to which the device is attached. Means 60 comprises a twist 63 formed in arm 10, so as to position the axis of bow 20 approximately 24 degrees from the vertical axis 62 of clamp 40, as illustrated in FIG. 4.

Referring again to FIG. 1, it will be seen that the device described above comprises essentially a single arm 10, and associated structural elements described above, which is pivotally attached by rivet 35 to clamp means 40. However, it is recognized that the most economical use of a vertical post 41 and the parking area adjoining it, can be attained by attaching a plurality of arms, such as for example arms 10 and 10a, to ears 49 and 49a of a single clamp means 40. This combination of structural elements permits the simultaneous utilization of parking area on more than one side of a vertical post, for bicycle parking purposes. Such a combination is indicated in FIG. 1 by designating each element of a second arm with numbers corresponding to those used to indicate components of the first arm, described above, and differentiated by the additional designation "a." Thus, it is seen that a second arm 10a is pivotally connected by rivet 35a to ear 49a of clamp means 40, in substantially the same manner previously described with reference to arm 10.

The structure of arm 10a and its associated equipment is the same as that shown in the drawings for arm 10, except that the various structural elements are arranged in reverse order with respect to means 40. Thus most of the structure associated with arm 10a has been omitted from the drawings for purposes of simplification and clarification.

Figure 5:
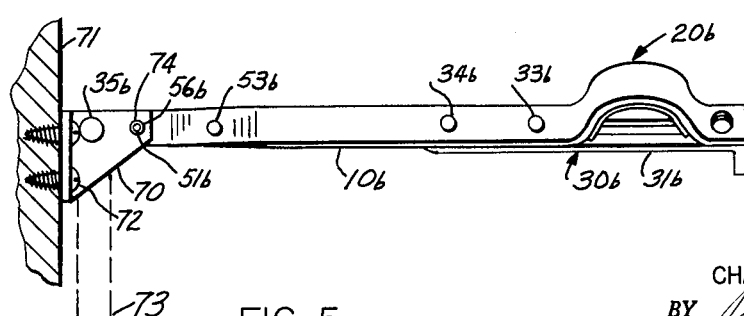
FIG. 5 is a side view of an alternative embodiment of the present invention, shown attached to a vertically disposed plane surface.

A second embodiment of this invention is shown in FIG. 5. In this embodiment arm 10b is substantially identical to arm 10 of the embodiment first described and shown in FIGS. 1, 2, 3 and 4. Means 20b comprises a bow formed in arm 10b for containing a structural element of a bicycle. Means 30b comprises a bolt 31b for retaining a bicycle element within means 20b. Bolt 31b is slidably secured to arm 10b by rivets 33b and 34b, substantially as previously described and shown in FIGS. 2 and 6. Arm 10b is pivotally secured, by rivet 35b, to angle bracket 70, which is secured to a supporting wall 71 by a plurality of screws 72. Opening 74 is located in bracket 70 so as to be in register with an opening 56b in arm 10b when said arm is positioned in a predetermined angular relationship with bracket 70 and support wall 71. Pin means 51b is provided for retaining arm 10b in said predetermined angular relationship with bracket 70, at times when it is desired to ready the device for use as a bicycle hitch.

Operation

As previously mentioned the device of this invention is intended for installation in an area designated as a bicycle parking area. It has been used to advantage in such an area where bicycle riders are expected to congregate, such as youth centers, schools and playgrounds. Of course, it can also be employed to advantage in larger or smaller numbers, wherever it is desired to secure a bicycle in upright and orderly disposition. Residence installations serve to keep bicycles secure against theft and disposed in orderly arrangement.

When such an area has been designated, one or more stationary support posts 41 (FIG. 1) of suitable size and configuration, may be installed in any desired manner, in a spaced and orderly arrangement, whereby a maximum number of upright bicycles may be parked within the designated area. A clamp means 40 is then positioned upon each post 41, spaced a suitable distance from the base for engaging the fork bearing post 21, or some other substantially vertical element of a bicycle 22. Means 40 is secured in fixed frictional engagement with post 41 by turning bolts 44 and 45 into nuts 47 and 48 (FIG. 3).

When immediate use of the device is not anticipated, arms 10 and 10a are permitted to rotate about rivets 35 and 35a to a depending position, corresponding to that of arm 10a in FIG. 1. When the device is readied for use, arm 10 is rotated about rivet 35, from the depending position, to a predetermined angular position such as the position of arm 10 in FIG. 1, where arm 10 is aligned longitudinally with clamp means 40, and is substantially perpendicular to post 41. Pin 51 is then positioned within opening 55 of arm 10 and opening 56 located in ear 49 of clamp 41. Thus pin 51 cooperates with arm 10 and ear 49 for maintaining arm 10 substantially perpendicular to post 41, at times when the device is readied for use in supporting a bicycle.

At such times, bolt 31 (FIG. 2) is slidably repositioned across rivets 33 and 34, and along bar 10 to the open position indicated by broken lines at 36; thus making the interior of bow 20 immediately accessible to the fork bearing post 21 of a bicycle 22 (FIG. 1). When an element of a bicycle is thus installed within opening 23, defined within bow 20, and is contained therein, it is secured against ready, or accidental, removal by slidably repositioning bolt 31 to the closed position of bolt 31 shown in solid lines in FIGS. 1 and 2. When bolt 31 is in the closed position, it is seen in FIG. 2 that an opening 13, located in bolt 31, is in register with a corresponding opening 14 in arm 10. Thus it is apparent that cooperating openings 13 and 14 will accommodate a padlock 15 (FIG. 1) for securing bicycle 22 against unauthorized removal from its parked position.

The operation of the second embodiment described above can readily be ascertained from the above description, by reference to the device as shown in FIG. 5 of the drawings. It will thus be apparent that arm 10b is moved, from the depending position 73, to the position shown in solid lines; when it is readied for use to support a bicycle in a vertical, parked position, adjacent the wall 71 to which the device is secured. Pin 51b cooperates with bores 74 and 56b to retain arm 10b in the substantially horizontal position of use. The device of this embodiment then functions in substantially the manner described above with reference to the first embodiment.

It is to be understood that the above described embodiments of this invention are for purposes of illustration only and various changes may be made therein without departing from the spirit and scope of my invention.

I claim as my invention:

1. A device for securing a bicycle element to a post, comprising in combination: an arm; means, comprising a bow formed in said arm, for containing said bicycle element; means, comprising a bolt slidably secured to said arm, for at times retaining said element within said bow; means for securing said element within said bow; means, comprising a clamp, for securing said arm to said post; and means for at times retaining said arm in specific angular relationship with said post.

2. A device for securing a bicycle element to a post, comprising in combination: an arm; means, comprising a bow formed in said arm, for containing said bicycle element; means, comprising a bolt slidably secured to said arm, for retaining said element within said bow at times when said bolt is in a closed position; means for securing said bolt in said closed position; means, comprising a clamp for securing said arm to said post; and means for at times retaining said arm in specific angular relationship with said clamp.

3. A device for securing a bicycle element to a post, comprising in combination: an arm; means, comprising a bow formed in said arm, for containing said bicycle element; means, comprising a bolt slidably secured to said arm, for retaining said element within said bow at times when said bolt is in a closed position; means for securing said bolt in said closed position; means, comprising a clamp pivotally connected to said arm, for securing said arm to said post; and means for at times retaining said arm in specific angular relationship with said clamp.

4. A device for securing a bicycle element to a post, comprising in combination: an arm; means, comprising a bow formed in said arm, for containing said bicycle element; means, comprising a twist formed in said arm for aligning said bow with said element; means, comprising a bolt slidably secured to said arm, for retaining said element within said bow at times when said bolt is in a closed position; means for securing said bolt in said closed position; means, comprising a clamp pivotally connected to said arm, for securing said arm to said post; and means for at times retaining said arm in specific angular relationship with said clamp.

5. A device for securing a plurality of bicycles to a post, comprising in combination: a plurality of arms; means, comprising a bow, formed in each of said arms, for containing a structural element of one of said bicycles; means, comprising a bolt slidably secured to each of said arms, for retaining said element within one of said bows at times when said bolt is in a closed position; means for securing said bolt in said closed position; means, comprising a clamp, pivotally connected to both of said arms, for securing said arms to said posts; and a plurality of separate means for at times retaining each of said arms in specific angular relationship with said clamp.

6. A device for securing a plurality of bicycles to a post, comprising in combination: a plurality of arms; means, comprising a bow formed in each of said arms, for containing a structural element of one of said bicycles; means, comprising a twist formed in each of said arms, for aligning said bow with said element; means, comprising a bolt slidably secured to each of said arms, for retaining said element within said bow at times when said bolt is in a closed position; a plurality of separate means for securing said bolts in said closed position; means, comprising a clamp pivotally connected to each of said arms, for securing said arms to said post; and a plurality of separate means for at times retaining each of said arms in specific angular relationship with said clamp.

7. A device for securing a bicycle to a plane surface, comprising in combination: an arm; means, comprising a bow formed in said arm, for containing a structural element of said bicycle; means, comprising a bolt slidably secured to said arm, for retaining said element within said bow at times when said bolt is in a closed position; means, comprising an angle plate pivotally connected to said arm, for securing said arm to said plane surface; and means for at times retaining said arm in specific angular relationship with said angle plate.

8. A device for securing a bicycle to a plane surface comprising in combination: an arm; means, comprising a bow formed in said arm, for containing a structural element of said bicycle; means, comprising a twist formed in said arm, for aligning said bow with said element; means, comprising a bolt slidably secured to said arm, for retaining said element within said bow at times when said bolt is in a closed position; means for securing said bolt in said closed position; means, comprising an angle plate pivotally connected to said arm, for securing said arm to said plane surface; and means for at times retaining said arm in specific angular relationship with said angle plate.

9. A device for securing the fork post of a bicycle to a fixed support, comprising in combination: an arm; means, comprising a bow formed in said arm for containing said fork post; means comprising a twist formed in said arm for aligning said bow with said fork post; a bolt, formed with a longitudinal slot, and secured in face to face engagement with said arm, adjacent said bow means, said bolt being slidably repositionable along said bar between open and closed positions; means comprising a lock for at times securing said bolt in the closed position; means, comprising a clamp for securing said arm to said support, said clamp being formed with an ear; means comprising a rivet for pivotally connecting said arm to said ear; means comprising a pin for maintaining said arm substantially perpendicular to said support, at times when the device is ready for use.

References Cited in the file of this patent
UNITED STATES PATENTS

| | | |
|---|---|---|
| 577,808 | Myers | Feb. 23, 1897 |
| 585,910 | Crisp | July 6, 1897 |
| 617,693 | Shultz | Jan. 10, 1899 |
| 1,595,419 | Woller | Aug. 10, 1926 |
| 1,915,371 | Lowman | June 27, 1933 |